(12) United States Patent
Chin et al.

(10) Patent No.: US 8,135,778 B1
(45) Date of Patent: Mar. 13, 2012

(54) METHOD AND APPARATUS FOR CERTIFYING MASS EMAILINGS

(75) Inventors: Ren Chin, San Francisco, CA (US); David Cowings, El Cerrito, CA (US); Sanford Jensen, Berkeley, CA (US)

(73) Assignee: Symantec Corporation, Mountain View, CA (US)

( * ) Notice: Subject to any disclaimer, the term of this patent is extended or adjusted under 35 U.S.C. 154(b) by 1382 days.

(21) Appl. No.: 11/116,572

(22) Filed: Apr. 27, 2005

(51) Int. Cl.
*G06F 15/16* (2006.01)

(52) U.S. Cl. ..................................... 709/206

(58) Field of Classification Search ............... 709/206
See application file for complete search history.

(56) References Cited

U.S. PATENT DOCUMENTS

| | | |
|---|---|---|
| 5,377,354 A | 12/1994 | Scannell et al. |
| 5,438,433 A | 8/1995 | Reifman et al. |
| 5,557,789 A | 9/1996 | Mase et al. |
| 5,619,648 A | 4/1997 | Canale et al. |
| 5,634,005 A | 5/1997 | Matsuo |
| 5,649,182 A | 7/1997 | Reitz |
| 5,678,041 A | 10/1997 | Baker et al. |
| 5,696,898 A | 12/1997 | Baker et al. |
| 5,809,242 A | 9/1998 | Shaw et al. |
| 5,826,022 A | 10/1998 | Nielsen |
| 5,845,263 A | 12/1998 | Camaisa et al. |
| 5,864,684 A | 1/1999 | Nielsen |
| 5,870,548 A | 2/1999 | Nielsen |
| 5,874,955 A | 2/1999 | Rogowitz et al. |
| 5,884,033 A | 3/1999 | Duvall et al. |
| 5,889,943 A | 3/1999 | Ji et al. |
| 5,905,863 A | 5/1999 | Knowles et al. |
| 5,930,479 A | 7/1999 | Hall |
| 5,968,117 A | 10/1999 | Schuetze |
| 5,978,837 A | 11/1999 | Foladare et al. |
| 5,999,932 A | 12/1999 | Paul |
| 5,999,967 A | 12/1999 | Sundsted |
| 6,023,700 A | 2/2000 | Owens et al. |
| 6,023,723 A | 2/2000 | McCormick et al. |
| 6,052,709 A * | 4/2000 | Paul .............................. 709/202 |
| 6,073,165 A | 6/2000 | Narasimhan et al. |
| 6,112,227 A | 8/2000 | Heiner |
| 6,146,026 A | 11/2000 | Ushiku |

(Continued)

FOREIGN PATENT DOCUMENTS

JP 10240649 9/1998

(Continued)

OTHER PUBLICATIONS

Clark et al., PCMAIL: A Distributed Mail System for Personal Computers, May 1986, MIT Laboratory for computer science, 28 Pages (1-28).

(Continued)

*Primary Examiner* — Christopher Biagini
(74) *Attorney, Agent, or Firm* — Meyertons, Hood, Kivlin, Kowert & Goetzel, P.C.; Dean M. Munyon (57) ABSTRACT

A method and system for creating bulk filters are described. In one embodiment, the method includes receiving probe email messages indicative of spam, grouping similar probe email messages, and creating a bulk filter for each group having at least a predefined number of probe email messages without human interaction. The method further includes distributing the resulting bulk filters to clients for detection of bulk email messages at the clients.

17 Claims, 7 Drawing Sheets

U.S. PATENT DOCUMENTS

| | | | |
|---|---|---|---|
| 6,157,630 | A | 12/2000 | Adler et al. |
| 6,158,031 | A | 12/2000 | Mack et al. |
| 6,161,130 | A | 12/2000 | Horvitz et al. |
| 6,173,364 | B1 | 1/2001 | Zenchelsky et al. |
| 6,182,118 | B1 | 1/2001 | Finney et al. |
| 6,189,026 | B1 | 2/2001 | Birrell et al. |
| 6,195,686 | B1 | 2/2001 | Moon et al. |
| 6,199,102 | B1 | 3/2001 | Cobb |
| 6,216,165 | B1 | 4/2001 | Woltz et al. |
| 6,226,630 | B1 | 5/2001 | Billmers |
| 6,230,156 | B1 | 5/2001 | Hussey |
| 6,266,692 | B1 * | 7/2001 | Greenstein ............ 709/206 |
| 6,314,454 | B1 | 11/2001 | Wang et al. |
| 6,327,610 | B2 | 12/2001 | Uchida et al. |
| 6,334,140 | B1 | 12/2001 | Kawamata |
| 6,377,949 | B1 | 4/2002 | Gilmour |
| 6,411,947 | B1 | 6/2002 | Rice et al. |
| 6,421,709 | B1 | 7/2002 | McCormick et al. |
| 6,438,608 | B2 | 8/2002 | Biliris et al. |
| 6,505,237 | B2 | 1/2003 | Beyda et al. |
| 6,546,416 | B1 * | 4/2003 | Kirsch ............ 709/206 |
| 6,549,957 | B1 | 4/2003 | Hanson et al. |
| 6,571,275 | B1 | 5/2003 | Dong et al. |
| 6,654,787 | B1 * | 11/2003 | Aronson et al. ....... 709/206 |
| 6,718,321 | B2 | 4/2004 | Birrell et al. |
| 6,732,157 | B1 | 5/2004 | Gordon et al. |
| 6,757,713 | B1 | 6/2004 | Ogilvie et al. |
| 6,816,884 | B1 * | 11/2004 | Summers ............ 709/206 |
| 6,829,635 | B1 * | 12/2004 | Townshend ............ 709/206 |
| 6,912,656 | B1 * | 6/2005 | Perlman et al. ........ 713/170 |
| 7,039,697 | B2 * | 5/2006 | Bayles ............ 709/206 |
| 7,092,992 | B1 * | 8/2006 | Yu ............ 709/206 |
| 7,257,564 | B2 * | 8/2007 | Loughmiller et al. ....... 709/206 |
| 2001/0011350 | A1 * | 8/2001 | Zabetian ............ 713/176 |
| 2002/0007301 | A1 | 1/2002 | Reuning |
| 2003/0023722 | A1 | 1/2003 | Vinberg |
| 2004/0123157 | A1 | 6/2004 | Alagna et al. |
| 2004/0128355 | A1 * | 7/2004 | Chao et al. ............ 709/206 |
| 2005/0033810 | A1 * | 2/2005 | Malcolm ............ 709/206 |
| 2005/0044153 | A1 * | 2/2005 | Gross ............ 709/206 |
| 2005/0060643 | A1 * | 3/2005 | Glass et al. ............ 715/501.1 |
| 2005/0081059 | A1 | 4/2005 | Bandini et al. |
| 2005/0108339 | A1 | 5/2005 | Gleeson et al. |
| 2005/0108340 | A1 | 5/2005 | Gleeson et al. |
| 2005/0160148 | A1 * | 7/2005 | Yu ............ 709/206 |
| 2005/0198170 | A1 * | 9/2005 | LeMay et al. ............ 709/206 |
| 2006/0031306 | A1 * | 2/2006 | Haverkos ............ 709/206 |
| 2006/0047766 | A1 * | 3/2006 | Spadea ............ 709/206 |
| 2006/0069697 | A1 * | 3/2006 | Shraim et al. ............ 707/102 |
| 2006/0288076 | A1 | 12/2006 | Cowings et al. |

FOREIGN PATENT DOCUMENTS

| | | | |
|---|---|---|---|
| WO | 9837680 | | 8/1998 |
| WO | WO 01/53965 | * | 7/2001 |

OTHER PUBLICATIONS

U.S. Appl. No. 10/117,065, entitled "Apparatus and Method for Weighted and Aging Spam Filtering Rules", by Sunil Paul, et al., filed on Apr. 4, 2002.

U.S. Appl. No. 10/871,583, entitled "System and Method for Filtering Spam Messages Utilizing URL Filtering Module", by Cowings, et al., filed on Jun. 17, 2004.

U.S. Appl. No. 10/949,465, entitled "System and Method for Filtering Fraudulent Email Messages", by Bruno, et al., filed on Sep. 24, 2004.

U.S. Appl. No. 11/127,814, entitled: "Method and Apparatus for Detecting Spam in Email Messages and Email Attachments", by Cowings, et al., filed on May 11, 2005.

U.S. Appl. No. 11/157,327, entitled "Method and Apparatus for Grouping Spam Email Messages", by Jensen, filed on Jun. 20, 2005.

U.S. Appl. No. 11/127,813, entitled "Method and Apparatus for Simulating End User Responses to Spam Email Messages" by Khalsa, et al., filed on May 11, 2005.

U.S. Appl. No. 11/048,958, entitled "Method and Apparatus for Determining the Source of an Email Message", by Mantel, filed on Feb. 1, 2005.

Arbor Networks, Fingerprint Sharing Alliance, A Community for Coordinated, Rapid Attack Resolution, White Paper, 5 pages, Available: http://www.arbornetworks.com/downloads/Fingerprint_branding_wpaper.pdf.

* cited by examiner

METHOD AND APPARATUS FOR CERTIFYING MASS EMAILINGS

FIELD OF THE INVENTION

The present invention relates to filtering electronic mail (email); more particularly, the present invention relates to creating filters to detect email spam.

BACKGROUND OF THE INVENTION

In recent years, spam has become a major problem for all Internet users. As the cost of processing power, email address acquisition and email software continue to fall, spam becomes increasingly cost-effective for spammers. Given the negligible cost involved in sending millions of unsolicited email messages, spammers need only capture a small response rate to make a profit. The growth trend of spam shows no sign of abating. According to recent statistics, spam currently accounts for over half of all email traffic in the U.S. This increase in both the volume and percentage of spam is not only worsening a resource drain for IT, it is also affecting how end users view email, which has become the primary form of communication in the enterprise.

Presently, there are products for filtering out unwanted email messages. However, these products typically fail to effectively compensate for the escalating volumes of spam.

SUMMARY OF THE INVENTION

A method and system for creating bulk filters are described. According to one aspect, the method includes receiving probe email messages indicative of spam, grouping similar probe email messages, and creating a bulk filter for each group having at least a predefined number of probe email messages without human interaction. The method further includes distributing the resulting bulk filters to clients for detection of bulk email messages at the clients.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for creating anti-spam rules are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
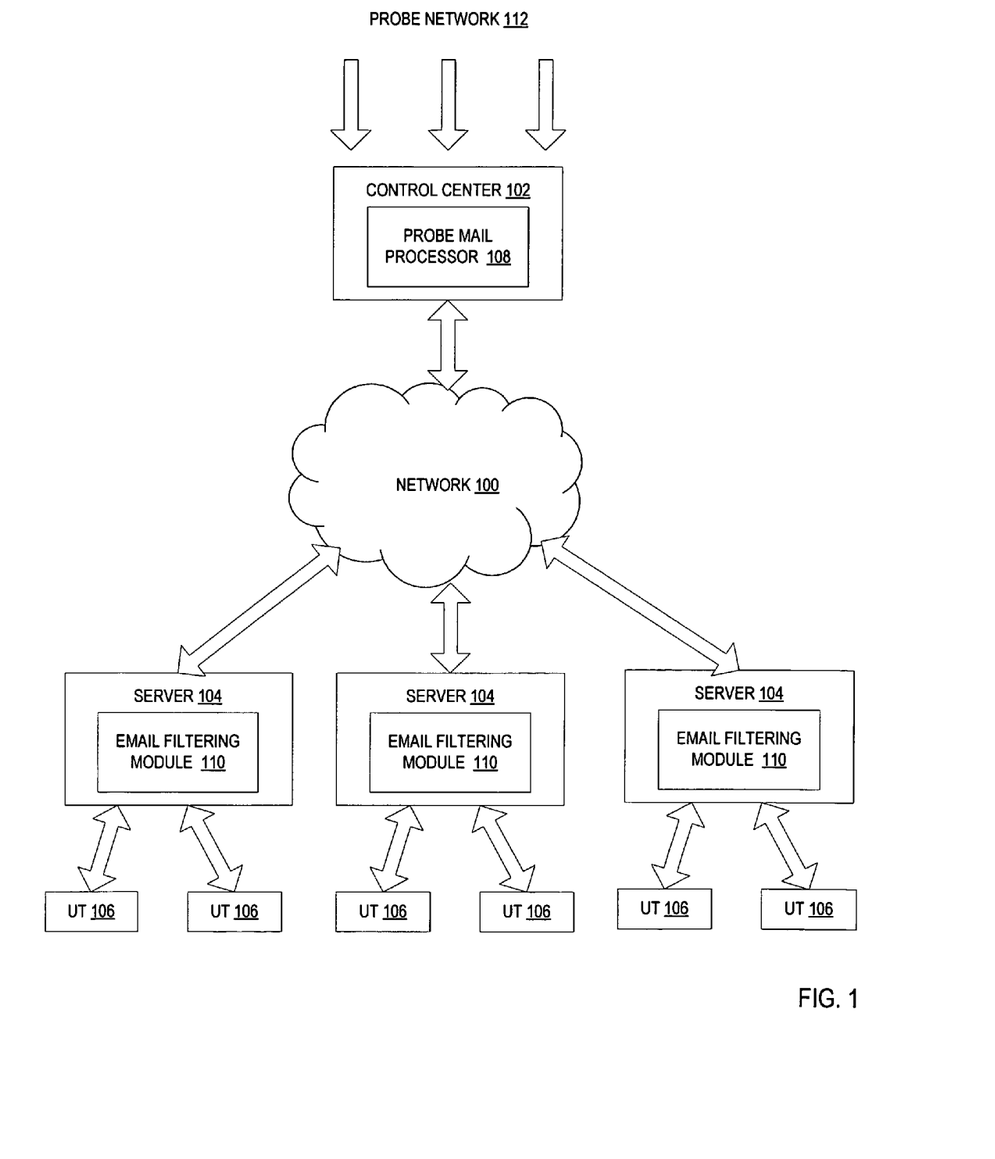
FIG. 1 is a block diagram of one embodiment of a system for controlling delivery of spam electronic mail.

FIG. 1 is a block diagram of one embodiment of a system for controlling delivery of spam electronic mail (email). The system includes a control center 102 coupled to a communications network 100 such as a public network (e.g., the Internet, a wireless network, etc.) or a private network (e.g., LAN, Intranet, etc.). The control center 102 communicates with multiple network servers 104 via the network 100. Each server 104 communicates with user terminals 106 using a private or public network.

The control center 102 is an anti-spam facility that is responsible for analyzing messages indicative of spam, developing filtering rules for detecting spam, and distributing the filtering rules to the servers 104. A message may be indicative of spam because it was collected via a "probe network" 112. In one embodiment, the probe network is formed by fictitious probe email addresses specifically selected to make their way into as many spammer mailing lists as possible. The fictitious probe email addresses may also be selected to appear high up on spammers' lists in order to receive spam mailings early in the mailing process (e.g., using the e-mail address "aardvark@aol.com" ensures relatively high placement on an alphabetical mailing list). The fictitious probe email addresses may include, for example, decoy accounts and expired domains. In addition, a certain percentage of assignable e-mail addresses offered by an ISP or private network may be reserved for use as probe email addresses. The probe network 112 may also receive email identified as spam by users of terminals 106.

A server 104 may be a mail server that receives and stores messages addressed to users of corresponding user terminals. Alternatively, a server 104 may be a different server (e.g., a gateway of an Internet Service Provider (ISP)) coupled to a mail server. Servers 104 are responsible for filtering incoming messages based on the filtering rules received from the control center 102. Servers 104 operate as clients receiving services of the control center 102.

In one embodiment, the control center 102 includes a probe mail processor 108 that is responsible for generating bulk filters and distributing the bulk filters to the servers 104 for detection of bulk email at the customer sites. In one embodiment, the probe mail processor 108 is also responsible for generating spam filters and distributing the spam filters to the servers 104 for detection of spam email at the customer sites. As will be discussed in more detail below, the bulk filters are generated without any human interaction and provide a more aggressive anti-spam mechanism.

Each server 104 includes an email filtering module 110 that is responsible for storing filters received from the control center 102 and detecting bulk and spam email using these filters.

In an alternative embodiment, each server 104 hosts both the probe mail processor 108 that generates bulk and spam filters and the email filtering module 110 that uses the generated filters to detect bulk and spam email.

Figure 2:
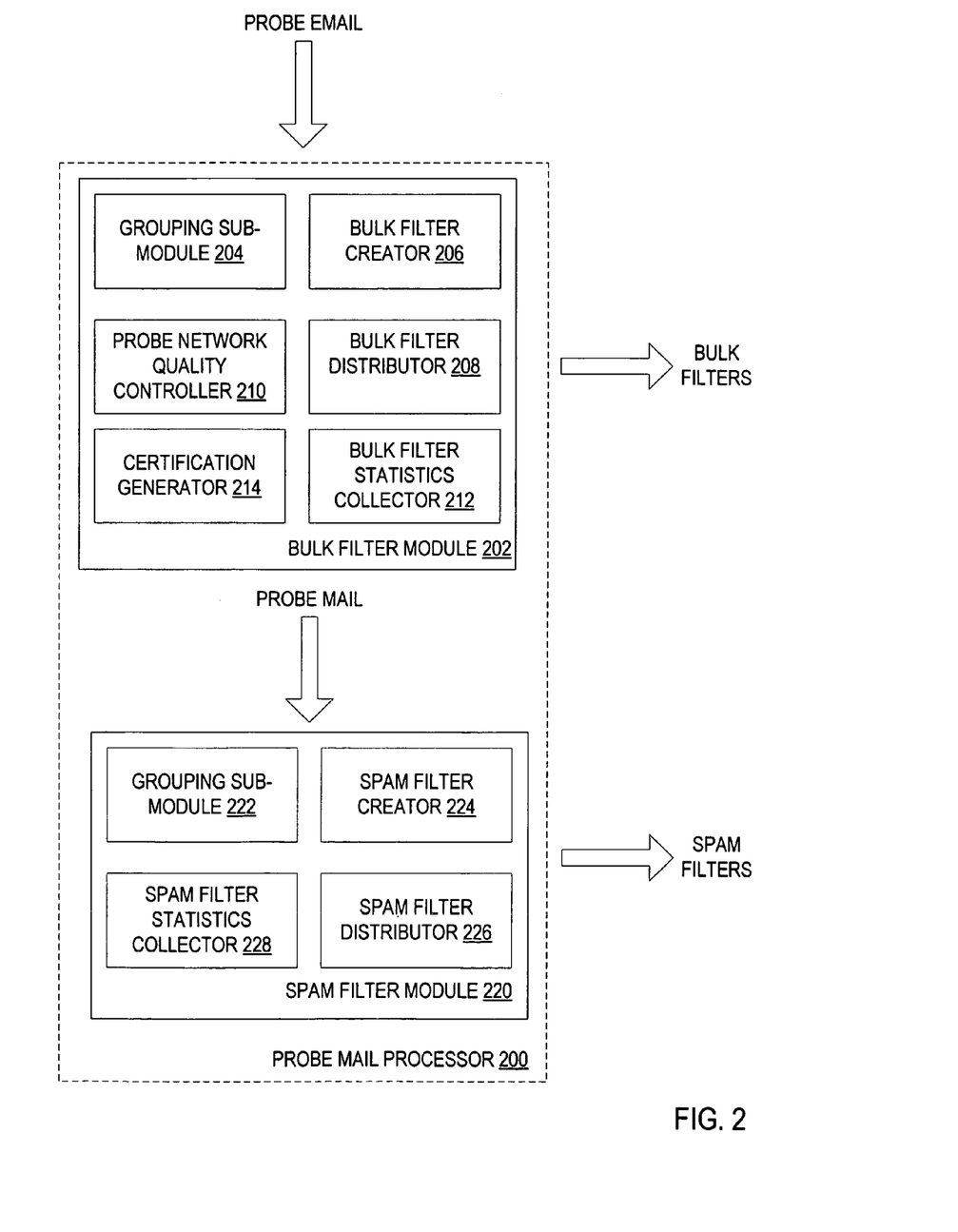
FIG. 2 is a block diagram of one embodiment of a probe mail processor module.

FIG. 2 is a block diagram of one embodiment of a probe mail processor 200. The probe mail processor 200 includes a bulk filter module 202 and a spam filter module 220. The bulk filter module 202 is responsible for providing bulk filters to the clients. The spam filter module 220 is responsible for providing spam filters to the clients.

The bulk filter module 202 includes a grouping sub-module 204, a bulk filter creator 206, a bulk filter distributor 208, a probe network quality controller 210, a certification generator 214, and a bulk filter statistics collector 212.

The grouping sub-module 204 is responsible for grouping similar probe email messages received from the probe network. Similar probe email messages are likely to result from the same spam attack. Each group created by the grouping sub-module 204 has one or more probe email messages.

The grouping sub-module 204 may determine the similarity of probe email messages by comparing, for example, message headers, message bodies (or portions of message body), message senders, or any combination of the above. The comparison may be done using regular expressions or mathematical signatures of probe email messages. Mathematical signatures of probe email messages may consist of checksums, hash values or some other data identifying the message content, and may be created using various algorithms that enable the use of similarity measures in comparing different email messages.

The bulk filter creator 206 monitors each group of similar probe email messages and determines whether a bulk filter should be created for a relevant group. In one embodiment, this determination is based on the number of probe email messages in the group. Once the number of probe email messages in the group reaches a predefined threshold, the bulk filter creator 206 creates a bulk filter for this group. The predefined threshold is maintained relatively low (e.g., the threshold may be equal to 2) to allow the probe mail processor 200 to address smaller spam attacks and to create filters faster. In one embodiment, the bulk filter creator 206 operates without any user intervention.

A bulk filter created by the bulk filter creator 206 contains data characterizing the contents of probe email messages from a relevant group. Such data may include, for example, a regular expression or a mathematical signature of a message or portions of a message. In one embodiment, the bulk filters are encoded to prevent the bulk filters from being easily identifiable or readable if intercepted by spammers.

The bulk filter distributor 208 is responsible for distributing created bulk filters to various clients for detection of bulk email at the clients. In one embodiment, the bulk filter distributor 208 sends the bulk rules to the clients periodically, based on a predefined time interval. Alternatively, the bulk filter distributor 208 sends the bulk rules to the clients once they are created.

The bulk filter statistics collector 212 is responsible for receiving statistics indicating reliability of bulk filters from the clients. The statistics may specify, for example, false positives (legitimate email messages considered as spam mail) and false negatives (spam email messages considered as legitimate mail) resulting from the use of bulk filters.

The certification generator 214 is responsible for certifying mass mailings of third parties. In particular, a third party (e.g., New York Times) may request a certification of their mass mailing (e.g., a daily news digest) prior to sending email messages to the users. In one embodiment, the certification generator 214 receives a request for certification of mass mailing with a sample email message from a third party, generates a key for this mass mailing and sends this key to the third party. The third party then adds this key to each message from the mass mailing to indicate that this message is part of the certified mass mailing. In addition, the certification generator 214 distributes the sample email message and the key to the clients to allow the clients to recognize email messages from the certified mass mailing.

The probe network quality controller 210 is responsible for ensuring that the probe network produces reliable probe data (i.e., provides spam email rather than legitimate email). As will be discussed in more detail below, in one embodiment, the probe network quality controller 210 removes probe email addresses producing a significant number of legitimate email messages. Probe email messages may be identified as legitimate mail based on internal checks and filters. In addition, in one embodiment, the probe network controller 210 periodically selects a group of probe email addresses, monitors probe data associated with these probe email addresses and scores each probe email address based on the reliability of the associated probe data. The scores may then be used to decide which probe email addresses should be removed from the probe network.

Probe mail collected from the probe network is passed through the bulk filter module 202 to the spam filter module 220. The spam filter module 220 includes a grouping sub-module 222, a spam filter creator 224, a spam filter distributor 226, and a spam filter statistics collector 228.

The grouping sub-module 222 is responsible for grouping probe email messages resulting from the same spam attack. The grouping may be based on the similarity of message headers, message bodies (or portions of message body), message senders, or any combination of the above.

The spam filter creator 224 is responsible for generating spam filters. The spam filters are generated based on detailed analysis of probe data. In one embodiment, this analysis is performed by a computer technician. In one embodiment, a spam filter is created for each group having at least a certain number of probe email messages. This number is higher than the threshold used for bulk filters because the spam filters are intended to address larger spam attacks.

A spam filter created by the spam filter creator 224 contains data characterizing the contents of probe email messages from a relevant group. Such data may include, for example, a regular expression or a mathematical signature of a message or portions of a message. In one embodiment, the spam filters are encoded to prevent the spam filters from being easily identifiable or readable if intercepted by spammers.

The spam filter distributor 226 is responsible for distributing created spam filters to various clients for detection of spam email at the clients. In one embodiment, the spam filter distributor 226 sends the spam rules to the clients periodically, based on a predefined time interval. Alternatively, the spam filter distributor 226 sends the spam rules to the clients once they are created.

The spam filter statistics collector 228 is responsible for receiving statistics indicating reliability of spam filters from the clients. The statistics may specify, for example, false positives and false negatives resulting from the use of spam filters.

The spam filters are created based on more detailed analysis and for larger potential spam attacks than the bulk filters. Thus, the spam filters are less likely to cause false positives at the clients than the bulk filters. In contrast, the bulk filters are created for smaller potential spam attacks and therefore can be propagated to the clients sooner and provide a broader rule set range, allowing the clients to prevent more spam email from reaching end users' inboxes. Accordingly, bulk filters provide a more aggressive anti-spam mechanism.

Figure 3:
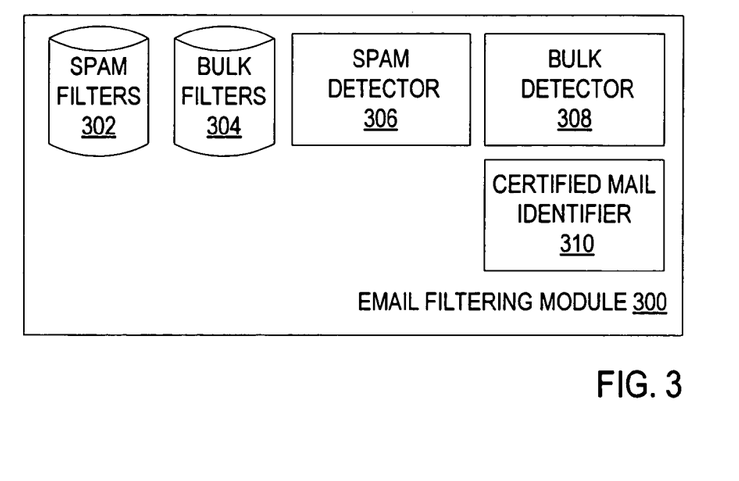
FIG. 3 is a block diagram of one embodiment of an email filtering module.

FIG. 3 is a block diagram of one embodiment of an email filtering module 300. The email filtering module 300 includes a spam filters database 302, a bulk filters database 304, a spam detector 306, a bulk detector 308, and a certified mail identifier 310.

The email filtering module 300 periodically receives spam filters and bulk filters from the control center 102 and stores them to the spam filters database 302 and the bulk filters database 304 respectively. In one embodiment, the email filtering module 300 sends an acknowledgment message to the control center 102 each time the spam and/or bulk filters are received and successfully stored to the databases 302 and/or 304.

The spam detector 306 is responsible for receiving an incoming email message and determining whether the incoming email message is spam based on the spam filters. If the determination is positive, the spam detector marks the incoming email message as spam.

In one embodiment, the spam detector 306 determines whether the incoming email message is spam by generating a mathematical signature of the incoming email message and comparing this signature with spam signatures in the spam filters. As discussed above, signatures of email messages may be created using various algorithms that allow for use of similarity measures in comparing different email messages.

The bulk detector 308 is responsible for determining whether the incoming email message is bulk based on the bulk filters. If the determination is positive, the bulk detector marks the incoming email message as bulk. In one embodiment, the bulk detector 308 determines whether the incoming email message is bulk by comparing the mathematical signature of the incoming email message with signatures contained in the bulk filters.

In one embodiment, if the incoming email message is bulk, the certified mail identifier 310 determines whether the incoming email message is part of certified mass mailing. If not, the incoming email message is marked as bulk. If so, the incoming email message is forwarded to the intended recipient.

Subsequently, different actions can be applied to spam email and bulk email. For example, spam email messages may be deleted and bulk email messages may be placed into a suspect spam folder, or spam email messages may be placed into a spam folder and bulk email messages may be marked as bulk and forwarded to recipients' inboxes.

The email filtering module 300 maintains statistics indicating the reliability of the spam and bulk filters based on user feedback and sends this statistics to the control center 102.

Figure 4:
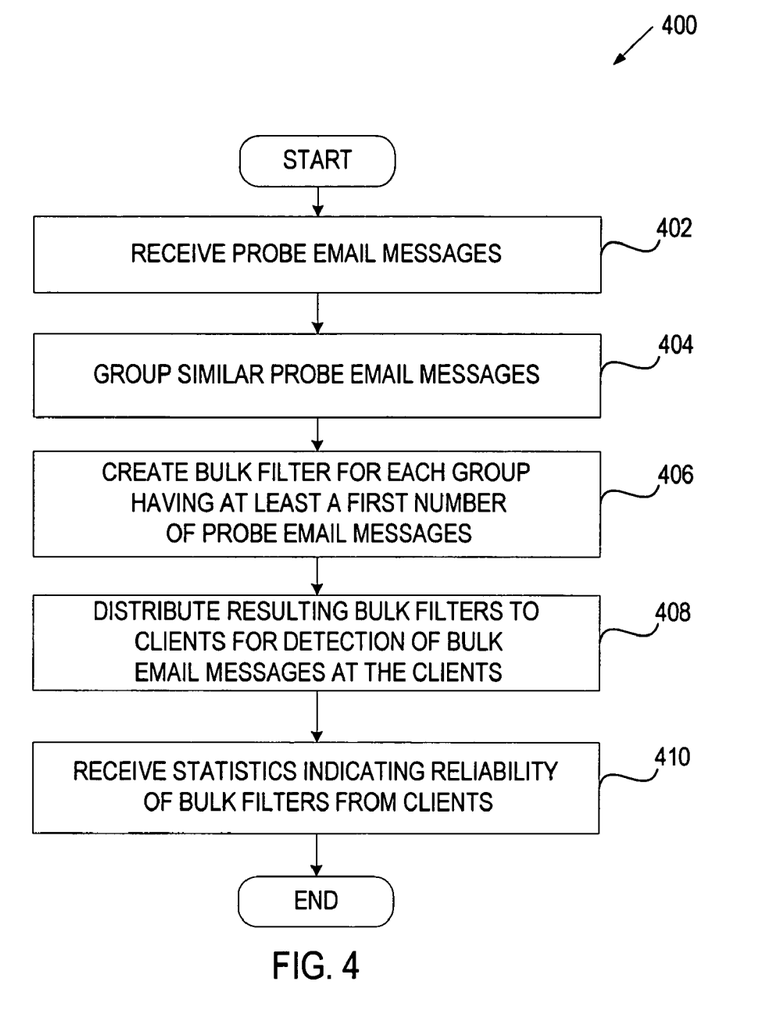
FIG. 4 is a flow diagram of one embodiment of a process for creating filters to detect spam emails.

FIG. 4 is a flow diagram of one embodiment of a process 400 for creating filters. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 4, process 400 begins with processing logic receiving probe email messages indicative of spam (processing block 402). Probe email messages are indicative of spam because they are collected via a probe network.

At processing block 404, processing logic groups similar probe email messages that potentially result from the same spam attack. In one embodiment, processing logic performs grouping by comparing signatures of the probe email messages. As discussed above, a signature may be a checksum, one or more values, or any other data characterizing the content of the email message. Each resulting group may contain one or more probe email messages.

At processing block 406, processing logic creates a bulk filter for each group with the number of probe email messages equal to, or greater than, a predefined threshold. The predefined threshold is maintained relatively low (e.g., equal to 2) to address small spam attacks. In one embodiment, a bulk filter includes a signature of a probe email message from a relevant group.

At processing block 408, processing logic distributes resulting bulk filters to clients for detection of bulk email messages at the client.

At processing block 410, processing logic receives statistics indicating the reliability of the bulk filters from the clients.

In one embodiment, processing logic also creates spam filters addressing potential spam attacks of larger sizes, distributes the spam filters to the clients for detection of spam email messages at the clients, and receives statistics indicating the reliability of the spam filters from the clients.

Figure 5:
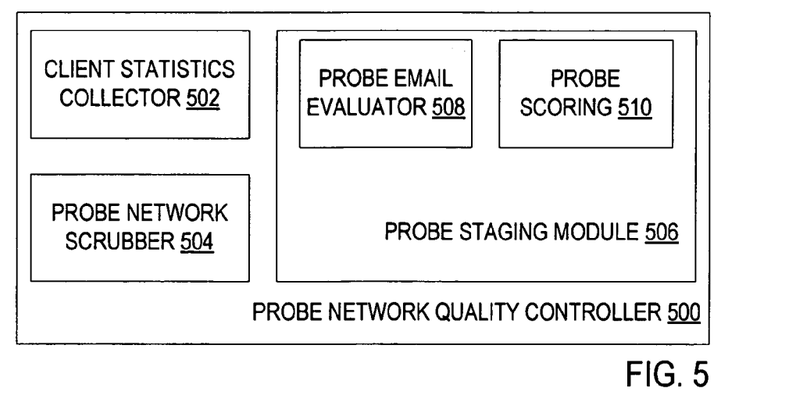
FIG. 5 is a block diagram of one embodiment of a probe network quality controller.

FIG. 5 is a block diagram of one embodiment of a probe network quality controller 500. The probe network quality controller 500 is responsible for making probe data more reliable and useful for automated bulk filter creation. The probe network quality controller 500 includes a client statistics collector 502, a probe network scrubber 504, and a probe staging module 506.

The client statistics collector 502 receives and stores clients' statistics indicating reliability of bulk and spam filters created based on probe email messages. In one embodiment, the client statistics collector 502 maintains statistics related to bulk filters separately from statistics related to spam filters. The statistics related to bulk and/or spam filters may be analyzed by control center technicians to identify probe email addresses that contribute non-spam data.

In one embodiment, the client statistics collector 502 is also responsible for minimizing the spammers' effects to "poison" the collected statistics. For example, the client statistics collector 502 can only allow a certain number of false positive submissions from an individual user over a given period of time. The client statistics collector 502 may also associate a negative rating for specific user accounts or blacklist a user account if it is determined to be detrimental.

The probe network scrubber 504 allows the technicians to age unreliable (e.g., producing false positives) bulk and/or spam filters and to remove from the probe network probe email addresses providing non-spam data. In one embodiment, the probe network scrubber 504 determines that a probe email message is legitimate based on internal checks (e.g., performed by a technician) and filters. A filter may identify, for example, email messages that have a sender's email address matching an IP address in the received header of the email message and representing a valid entity. Once the probe email message is filtered as legitimate, it may be subjected to an internal check by a technician to confirm that this probe email message is in fact legitimate.

The probe staging module 506 is responsible for reviewing probe data and assigning and classifying varying quality states to probe email addresses, thereby maintaining high quality of probe data coming into the control center 102. The probe staging module 506 includes a probe email evaluator 508 and a probe scoring sub-module 510. In one embodiment, the probe staging module 506 operates without any user intervention.

The probe email evaluator 508 selects one group of probe email addresses at a time, monitors probe data generated by this group of probe email addresses during a predefined time period (e.g., a month), and determines the quality of the probe email addresses. In one embodiment, the probe email evaluator 508 evaluates probe data associated with a specific probe email address using heuristic analyses that may, for example, consider how this probe email address was created, quality history associated with the probe email address, and various other data. The probe email evaluator 508 may also use "whitelist" heuristics that causes a probe email addresses to be whitelisted if it receives mail from a non-spammer, except when this mail has certain spam-like characteristics (e.g., includes pornographic content, falsified headers, etc.).

In one embodiment, the probe email evaluator 508 does not evaluate the entire probe data received at this probe email address but rather evaluates a certain percentage of this probe data.

The probe scoring sub-module 510 is responsible for maintaining quality history of probe email addresses and adjusting this quality history based on the evaluation performed by the probe email evaluator 508. For example, probe email addresses that generate a large amount of spam and no legitimate mail may be assigned the highest quality score; probe email addresses that generate legitimate mail may be assigned a lower quality score and may be automatically moved to a reserve (inactive) state (e.g., until its quality improves).

In one embodiment, each probe email address should go through the probe staging process (e.g., once every 6 months). In particular, a probe email address may be rated during a predefined time period (e.g., 30 days) to determine whether this probe email address should remain in the probe network, be moved to a reserve state or be removed from the probe network.

In one embodiment, the probe email evaluator 508 is also responsible for tracking the uniqueness of the probe message production (e.g., to remove duplicate messages).

Figure 6:
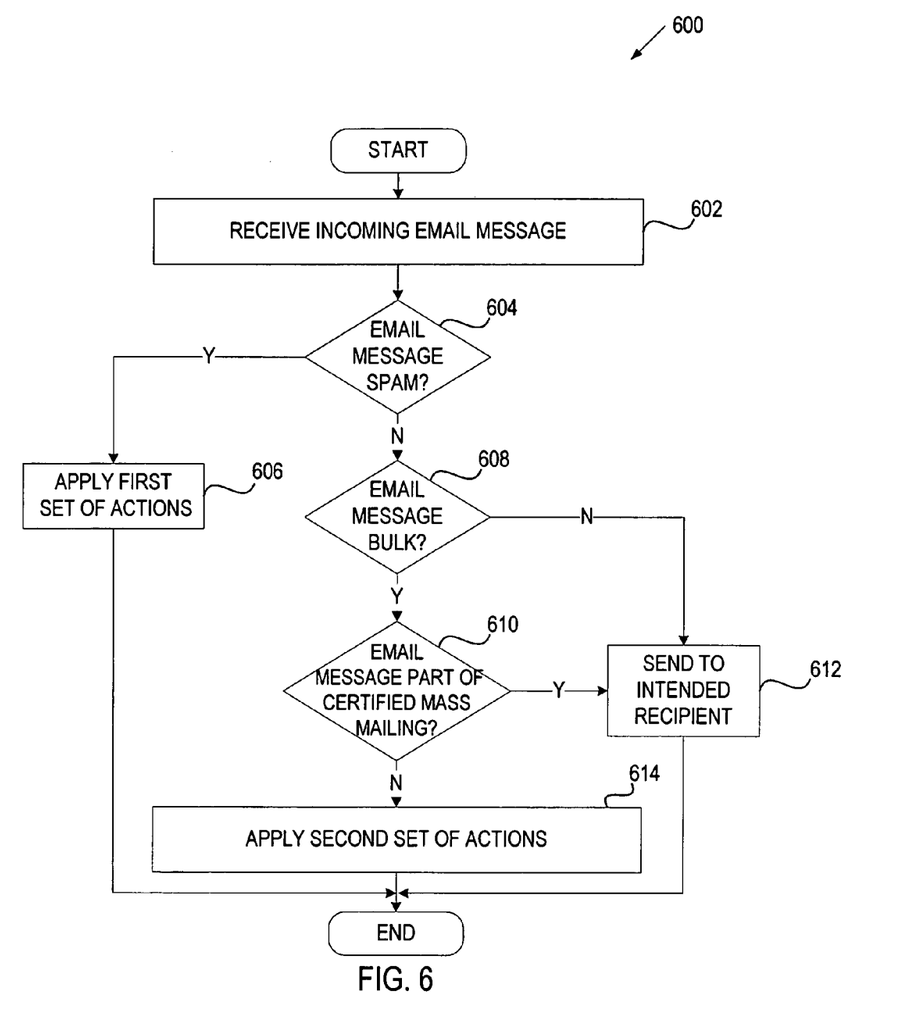
FIG. 6 is a flow diagram of one embodiment of a process for filtering incoming email messages using bulk filters.

FIG. 6 is a flow diagram of one embodiment of a process 600 for filtering incoming email messages. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a client at a customer site. As discusses above, server 104 acts as a client receiving services of the control center 102.

Referring to FIG. 6, process 600 begins with processing logic receiving an incoming email message (processing block 602).

At processing block 604, processing logic applies spam filters to the incoming message to determine whether the incoming message is spam. If so, processing logic applies a first set of actions to the incoming message (processing block 606). For example, processing logic may delete the incoming message or place the incoming message into a spam folder.

If the incoming message is not spam, processing logic applies bulk filters to the incoming message to determine whether the incoming message is bulk (processing block 608). If not, processing logic sends the incoming message to its intended recipient (processing block 612). If so, processing logic determines whether the incoming message is part of certified mass mailing (processing block 610). In one embodiment, processing logic makes this determination by comparing the incoming message with sample messages of certified mass mailings. If a match is found, processing logic compares certification (e.g., a key) associated with the matching sample message to the certification contained in the incoming message.

If both certifications match, processing logic determines that the incoming message is part of certified mass mailing and sends the incoming message to the recipient (processing block 612). Alternatively, if the incoming email message is not part of certified mass mailing, processing logic applies a second set of actions to the incoming message (processing block 614). For example, processing logic may place the incoming message into a suspect spam folder, tag the incoming message as bulk and send to the recipient, etc.

An Exemplary Computer System

Figure 7:
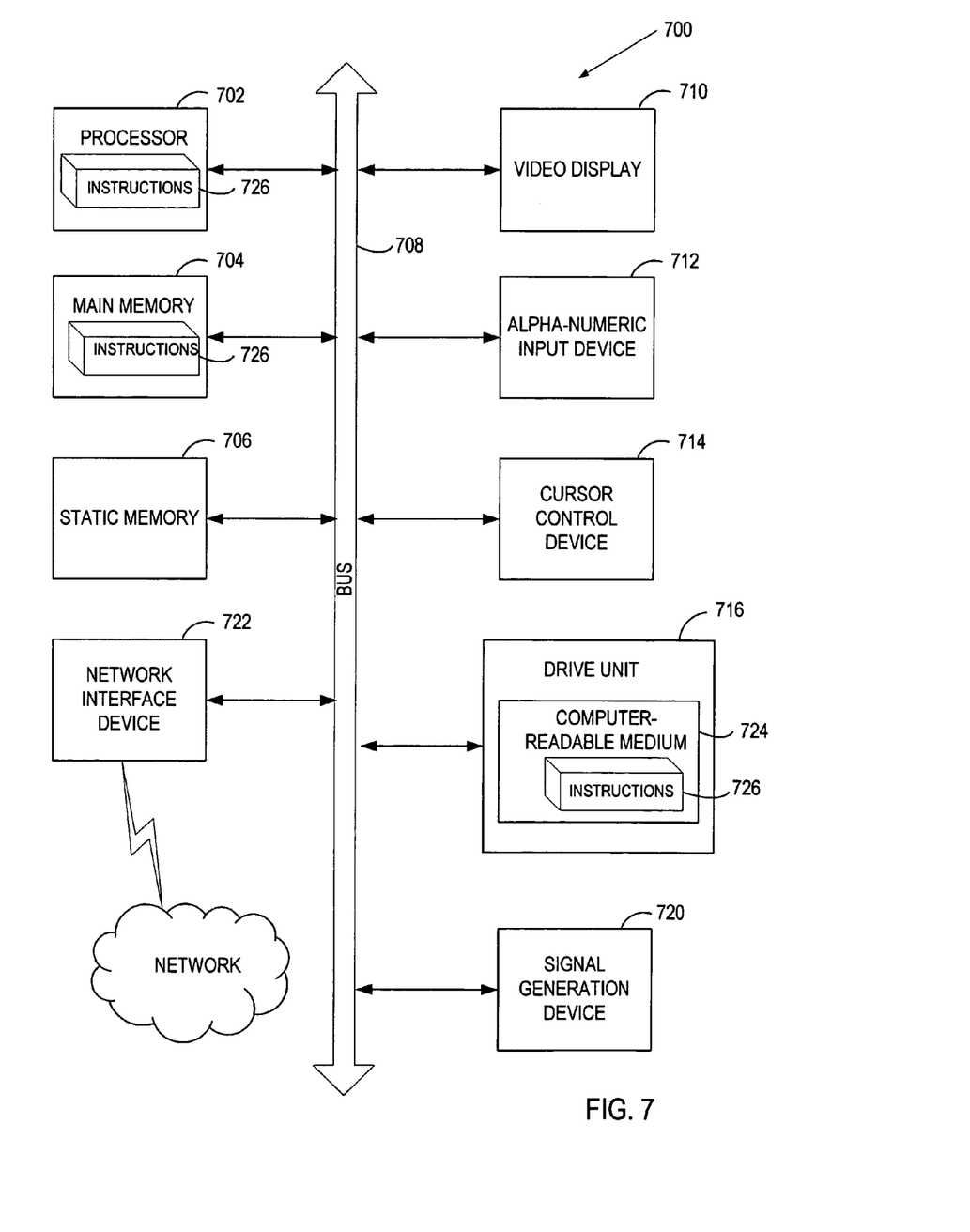
FIG. 7 is a block diagram of an exemplary computer system.

FIG. 7 is a block diagram of an exemplary computer system 700 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard), a cursor control device 714 (e.g., a mouse), a disk drive unit 716, a signal generation device 720 (e.g., a speaker) and a network interface device 722.

The disk drive unit 716 includes a computer-readable medium 724 on which is stored a set of instructions (i.e., software) 726 embodying any one, or all, of the methodologies described above. The software 726 is also shown to reside, completely or at least partially, within the main memory 704 and/or within the processor 702. The software 726 may further be transmitted or received via the network interface device 722. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
a control center creating, without human interaction, bulk filters for groups of a plurality of received email messages, the control center comprising a computer system;
the control center receiving a request from a mass mailer to perform a certified mass mailing, wherein the request includes a sample email message of the mass mailer, the mass mailer comprising a computer system;
in response to receiving the request, the control center generating a key to be associated with the certified mass mailing and sending the key to the mass mailer;
the control center distributing the created bulk filters, the sample email message, and the key to a plurality of mail servers;
wherein the bulk filters are usable by a given one of the plurality of mail servers to determine whether messages received at the given mail server are bulk email messages; and
wherein the given mail server is configured to identify a bulk email message as being part of the certified mass mailing by:
comparing the bulk email message with one or more samples of certified mass mailings to determine whether a match is found between the bulk email message and the sample email message, wherein the one or more samples include the sample email message;
in response to finding the match, determining whether the bulk email message includes the key associated with the certified mass mailing; and
identifying the bulk email message as being part of the certified mass mailing in response to the bulk email message including the key associated with the certified mass mailing.

2. The method of claim 1, wherein the plurality of received email messages are collected using a plurality of fictitious probe email addresses selected to appear on spam email mailing lists, wherein one of the fictitious probe email addresses includes an expired domain name.

3. The method of claim 1, further comprising:
the control center creating spam filters for groups of received probe email messages;
the control center distributing the created spam filters to a plurality of mail servers for detection of spam email messages at the plurality of mail servers; and
the control center maintaining separate statistics that indicate reliability of the created bulk and spam filters.

4. The method of claim 3, wherein the maintained statistics are received from the plurality of mail servers, and wherein the method further comprises: limiting a number of false positive submissions of a mail server over a predetermined time period.

5. The method of claim 1, further comprising:
aging a bulk filter that identifies legitimate email messages as bulk.

6. The method of claim 1, wherein the plurality of email messages are collected using a plurality of fictitious probe email addresses, and wherein the method further comprises:
removing, from a list of the plurality of fictitious probe email addresses, email addresses providing legitimate data.

7. The method of claim 1, wherein the plurality of email messages are collected using a plurality of fictitious probe email addresses, and wherein the method further comprises:
assigning scores to the plurality of fictitious probe email addresses based on an amount of received spam or an amount of received legitimate mail.

8. The method of claim 1, further comprising:
encoding the bulk filters to prevent the bulk filters from being intercepted during transmission to a mail server.

9. The method of claim 1, wherein the given mail server is configured to:
deliver to a recipient at least a subset of the bulk email messages.

10. The method of claim 1, wherein the certified mass mailing is a news digest.

11. A method comprising:
a computer system receiving a request from a mass mailer to perform a certified mass mailing, wherein the request includes a sample email message of the mass mailer, the mass mailer comprising a second computer system;
in response to receiving the request, the computer system distributing the sample email message and a key to be associated with the certified mass mailing to a plurality of other computer systems; and
wherein each of the plurality of other computer systems is configured to identify a bulk email message as being part of the certified mass mailing by:
comparing the bulk email message and the sample email message to determine whether a match is found;

in response to finding the match, determining whether the bulk email message includes the key associated with the certified mass mailing; and identifying the bulk email message as being part of the certified mass mailing in response to the bulk email message including the key associated with the certified mass mailing.

12. The method of claim 11, further comprising:

after receiving the request, the computer system generating the key to be associated with the certified mass mailing.

13. A computer mail system comprising:

a processor; and a memory storing program instructions executable to:
  receive a request from a mass mailer to perform a certified mass mailing, wherein the request includes a sample email message of the mass mailer, the mass mailer comprising a computer system;
  in response to receiving the request, generate a key to be associated with the certified mass mailing and send the key to the mass mailer; and
  distribute the sample email message and the key to a plurality of mail servers, wherein each mail server is configured to:
    compare a bulk email message with the sample email message;
    in response to finding that the bulk email message and the sample email message match, determine whether the bulk email message includes the key associated with the certified mass mailing; and
    identify the bulk email message as being part of the certified mass mailing in response to the bulk email message including the key associated with the certified mass mailing.

14. A computer readable memory medium storing program instructions executable on a mail processing computer system to:

create bulk filters for groups of a plurality of received email messages without human interaction;

receive a request from a mass mailer to perform a certified mass mailing, wherein the request includes a sample email message of the mass mailer, the mass mailer comprising a computer system;

in response to receiving the request, generate a key to be associated with the certified mass mailing and send the key to the mass mailer;

distribute the created bulk filters, the sample email message, and the generated key to a plurality of mail servers;

wherein the bulk filters are usable by a given one of the plurality of mail servers to determine whether messages received at the given mail server are bulk email messages; and wherein the given mail server is configured to identify a bulk email message as being part of the certified mass mailing by:
  comparing the bulk email message with one or more samples of certified mass mailings to determine whether a match is found between the bulk email message and the sample email message, wherein the one or more samples include the sample email message;
  in response to finding the match, determining whether the bulk email message includes the key associated with the certified mass mailing; and
  identifying the bulk email message as being part of the certified mass mailing in response to the bulk email message including the key associated with the certified mass mailing.

15. The medium of claim 14, wherein the plurality of received email messages are collected using a plurality of fictitious probe email addresses selected to appear on spam email mailing lists, and wherein one of the fictitious probe email addresses includes an expired domain name.

16. The medium of claim 15, wherein the program instructions are further executable to:

assign scores to the plurality of fictitious probe email addresses based on an amount of received spare or an amount of received legitimate mail.

17. A computer readable memory medium storing program instructions executable on a mail processing computer system to:

receive a request from a mass mailer to perform a certified mass mailing, wherein the request includes a sample email message of the mass mailer, the mass mailer comprising a computer system;

in response to receiving the request, generate a key to be associated with the certified mass mailing and send the key to the mass mailer; and distribute the sample email message and the key to a plurality of mail servers, wherein each mail server is configured to:
  compare a bulk email message with the sample email message;
  in response to finding that the bulk email message and the sample email message match, determine whether the bulk email message includes the key associated with the certified mass mailing; and
  identify the bulk email message as being part of the certified mass mailing in response to the bulk email message including the key associated with the certified mass mailing.

\* \* \* \* \*